July 23, 1946.   T. HASEGAWA   2,404,707
METAL SAWING MACHINE
Filed Aug. 14, 1940   6 Sheets-Sheet 4
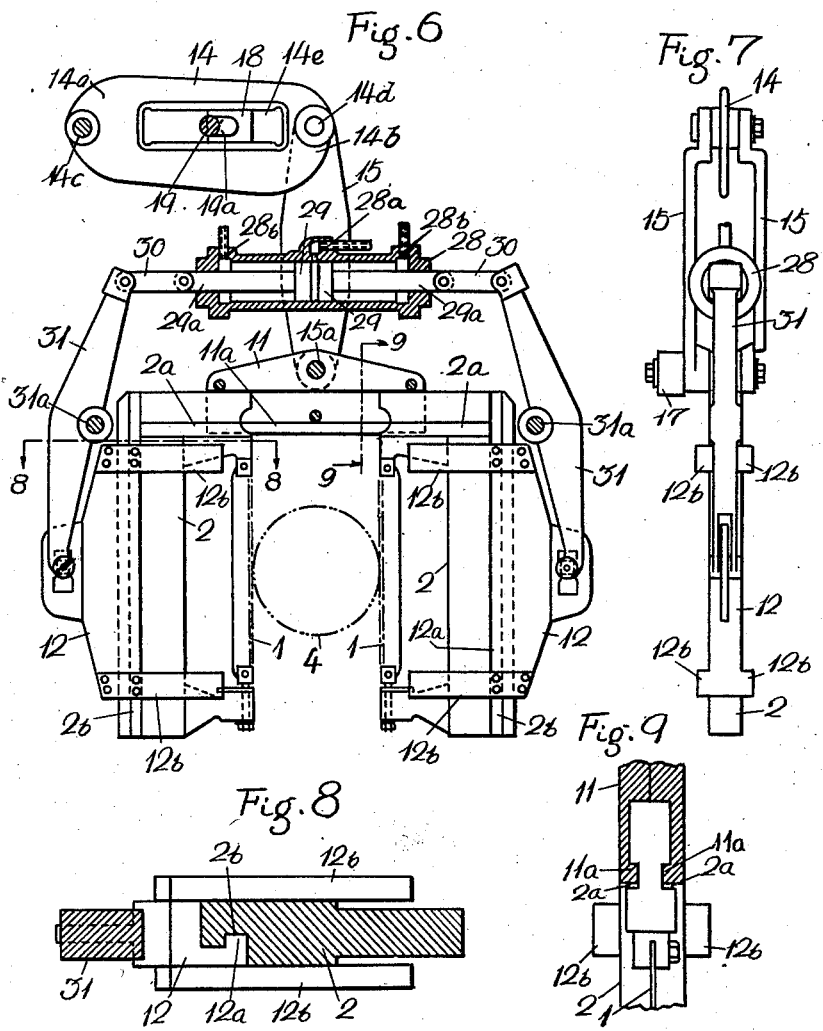

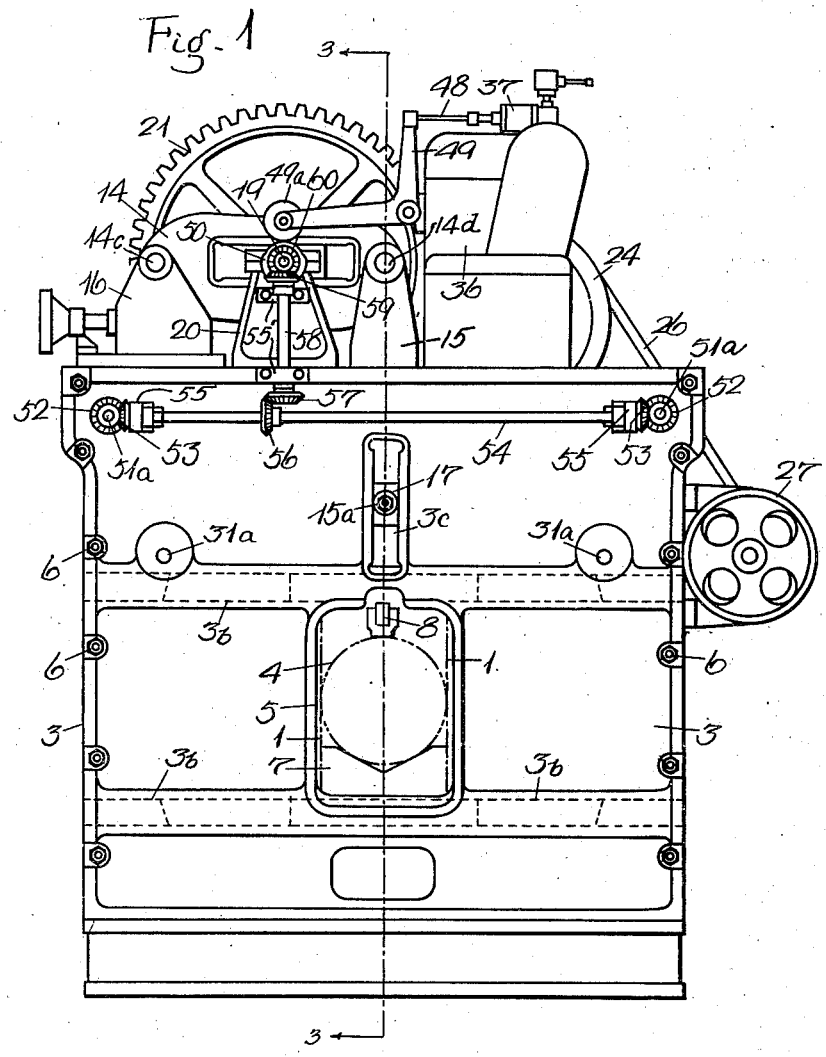

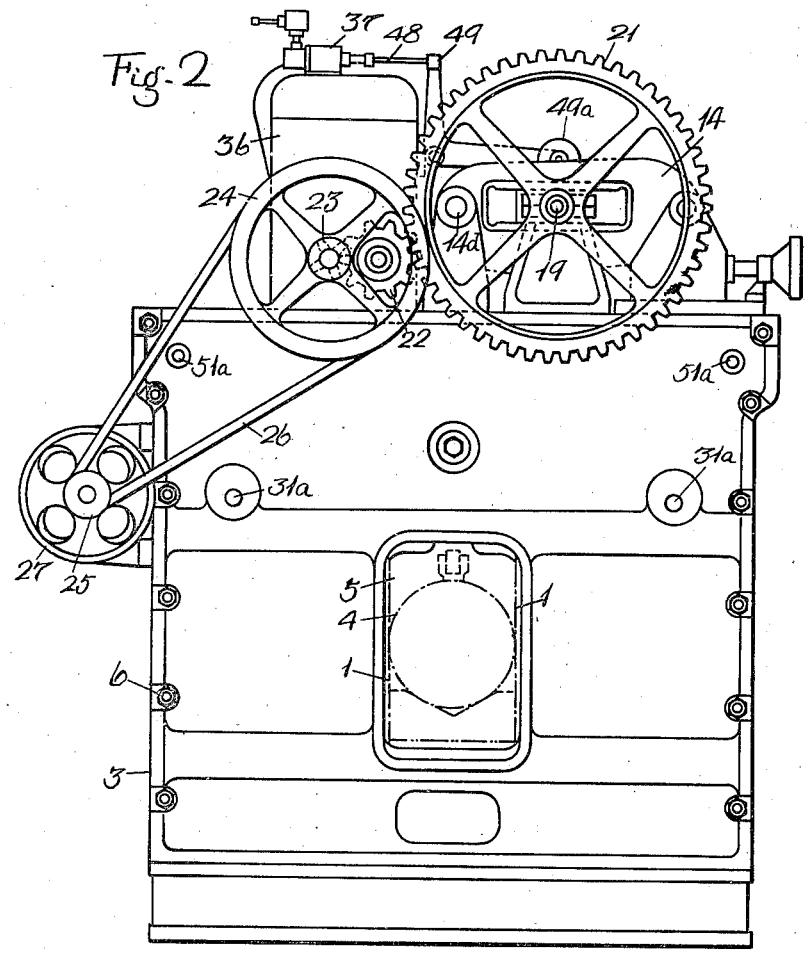

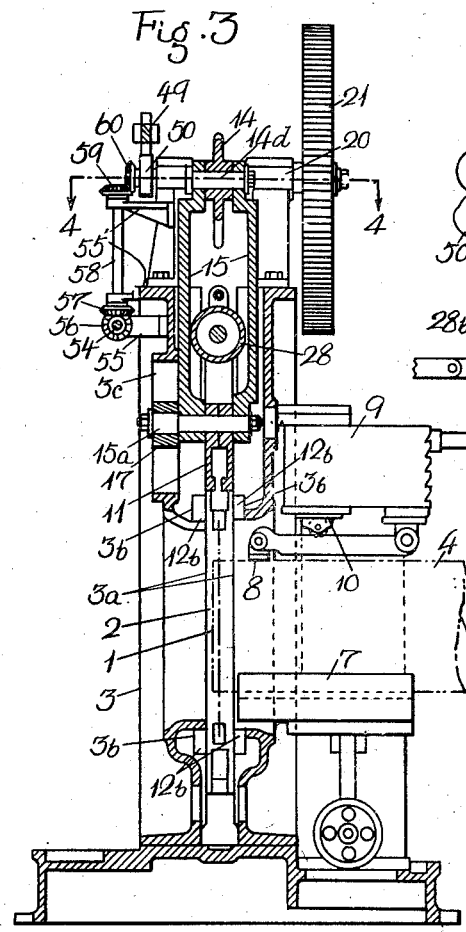

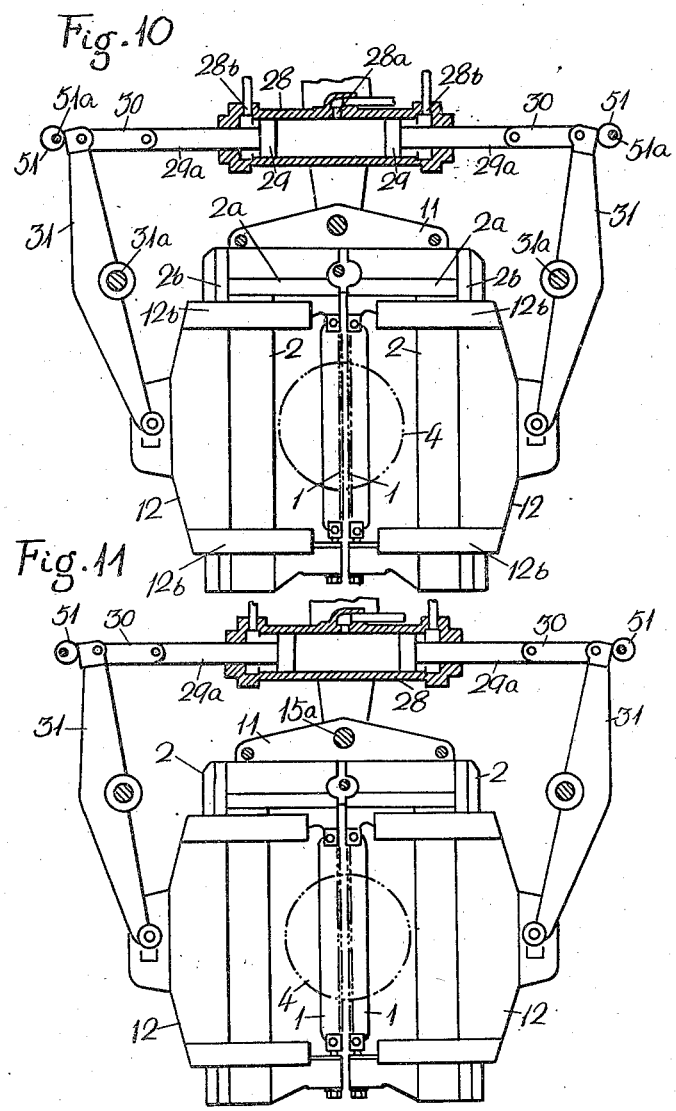

July 23, 1946. T. HASEGAWA 2,404,707
METAL SAWING MACHINE
Filed Aug. 14, 1940 6 Sheets-Sheet 6
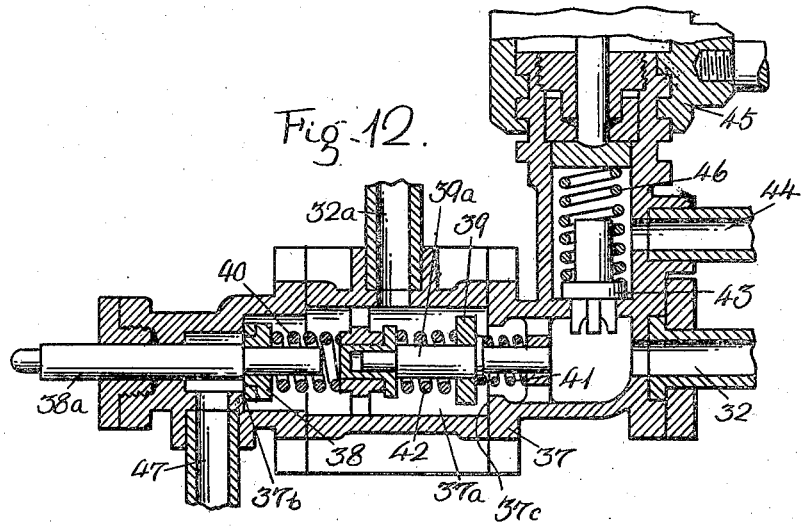
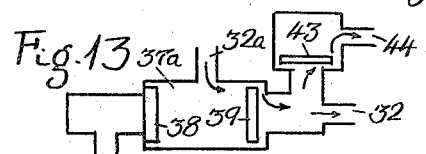
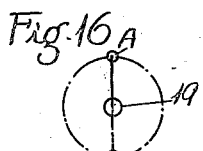
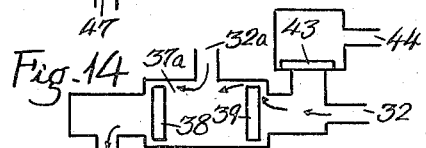
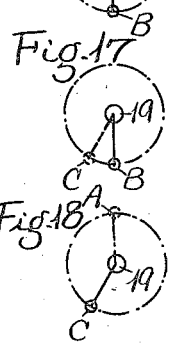
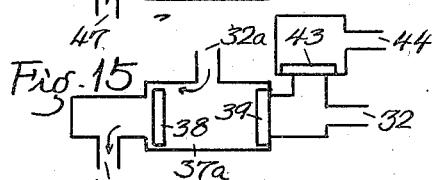
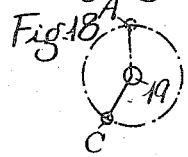
Inventor:
T. Hasegawa
By E. F. Wenderoth
Atty Patented July 23, 1946

2,404,707

UNITED STATES PATENT OFFICE 2,404,707

METAL SAWING MACHINE

Takao Hasegawa, Osaka, Japan; vested in the Alien Property Custodian

Application August 14, 1940, Serial No. 352,616
In Japan August 30, 1939

8 Claims. (Cl. 29—74)

My invention relates to improvements in metal sawing machines in which two vertical bow saws are provided, lying in the same vertical plane, and having means which move the saws up and down and having also means which in relation to the said upward and downward movement draw the saws toward one another when the saws are moving downwardly and which move the saws away from one another when they are moving upwardly, and the objects of the improvements are, first, to construct machines which cut metals from both sides simultaneously; second, to cut metals with the least strain on the cut faces of the metals; and third, to avoid unnecessary force which would otherwise be exerted in the sawing operation, thereby attaining higher sawing efficiency, as compared with similar machines heretofore in use.

I attain these objects by mechanism illustrated in the accompanying drawings, in which Fig. 1 is a front elevation of a machine embodying the invention;

Fig. 2 is a rear elevation;

Fig. 3 is a vertical section of the machine taken on the line 3—3 of Fig. 1;

Fig. 4 is a sectional plan of a part of the machine taken on the line 4—4 of Fig. 3;

Fig. 5 is an elevation showing connecting pipes of oil pressure pumps;

Fig. 6 is an elevation showing the operating mechanism, the machine frame and other parts of the machine being omitted;

Fig. 7 is a side elevation corresponding to Fig. 6;

Fig. 8 is an enlarged sectional plan of a part of the machine taken on the line 8—8 of Fig. 6;

Fig. 9 is an enlarged section of a part of the machine taken on the line 9—9 of Fig. 6;

Figs. 10 and 11 are elevations of the apparatus shown in Fig. 3 as it appears in the last two operations;

Fig. 12 is an enlarged section of the oil pressure regulator;

Figs. 13, 14 and 15 are diagrammatic illustrations showing the operation of the oil pressure regulator; and Figs. 16, 17 and 18 are diagrammatic illustrations showing the rotation of the operating crank corresponding respectively to Figs. 13, 14 and 15.

Referring to the drawings in detail, 1, 1 (Fig. 6) are the two vertically disposed bow saw blades, and 2, 2 are the bow frames to which the blades 1, 1, respectively, are fixed at both ends. 3, 3 (Fig. 1 and Fig. 2) are the machine frames which carry the frames 2, 2, and in the center of which is an opening 5 into which the material 4 to be cut is inserted. 6 are the bolts holding the machine frames 3, 3 together. 7 and 8 are respectively the receiving seat and the clamp which hold the material 4 therebetween in the opening 5, and on the clamp 8 are provided the oil pressure cylinder 9 and ram 10, to operate the clamp 8. 2—a (Fig. 6) are horizontal guide grooves at the upper part and at both the front and rear sides, of the bow-shaped frames 2, 2, and 2—b (Figs. 6 and 8) are the vertical guide grooves at one side of each of the frames 2, 2. 11 is the guide block common to the saws 1, 1, and is formed of two plates connected to hold the frames, 2, 2 therebetween, and having projections 11—a (Fig. 9) to correspond with the horizontal grooves 2—a of the frames 2, 2. By means of these projections 11—a, the upward and downward movements of the saws 1, 1 are accomplished, and they serve to guide the rightward and leftward movements of the saws 1, 1. 12 are guide blocks provided for the saws 1, 1, each having a projection 12—a to correspond with the vertical groove 2—b (Fig. 8) of the frame 2, and these projections 12—a accomplish the rightward and leftward movements of the saws 1, 1 and also serve to guide the upward and downward movements of the saws 1, 1. 12—b are the horizontal guide rods secured at both front and back sides of the guide blocks 12 and received in the horizontal channels 3—b in guide paths 3—a (Fig. 3) of the machine frames 3, 3 in order not only to retain the guide blocks 12 in their position but also to guide the rightward and leftward movements of the guide blocks 12. The frames 2, 2 and guide blocks 12, 12 slide along the guide paths 3—a of the machine frames 3, 3, whereby they are prevented from rocking.

14 is a horizontal lever, one end 14—b of which is connected to the central guide block 11 through a link 15, while the other end 14—a is supported by a bearing 16 (Fig. 1) which is adjustably mounted to move on the machine frame 3. 14—c is the supporting pintle by which the end 14—a is pivoted on the bearing 16, and 14—d is the pintle connecting the end 14—b with the link 15. 15—a is the pintle connecting the link 15 with the block 11. One end of this pintle 15—a extending into the vertical guide slot 3—c (Fig. 1) in the front machine frame 3, is connected to the slide 17 which is slidably mounted in the guide slot 3—c, so that the block 11 is allowed only vertical movement. 14—e (Fig. 6) is the guide slot in the lever 14. A slide 18 which is mounted in this slot 14—e is connected to the crank 19—a of the rotatable shaft 19 supported in the bearing 20

(Fig. 3) on the machine frame 3, and driven by the motor 27 through gears 21, 22 and 23, pulleys 24 and 25 and belt 26, as shown in Fig. 2. By rotating shaft 19, the lever 14 (Fig. 6) is moved up and down and consequently imparts upward and downward motion to both saws 1, 1, through link 15 and block 11.

28 (Fig. 6) is an oil pressure cylinder mounted on the machine frames 3, 3 in the space above the block 11, and having two pistons 29, 29 therein. Each piston 29 has a piston rod 29—a connected to the guide blocks 12, respectively, through links 30 and vertical levers 31 which are pivoted to the front and back machine frames 3, 3, on pintles 31—a. Simultaneously with the start of the descent of both saws 1, 1, pressure oil is fed through the aperture 28—a in the middle of the cylinder 28 so as to push the pistons 29 outwardly, and cause pressure on both saws 1, 1, causing them to move toward the material 4 while when the saws 1, 1 start to ascend the pressure oil is forced out of the aperture 28—a in the middle of the cylinder 28, pressure oil being fed into the cylinder 28 through apertures 28—b at the ends of the cylinder 28, to operate on the pistons 29 from the opposite direction causing the saws 1, 1 to separate, moving them away from the material 4.

The invention also provides means by which the edges of the saws 1, 1 are moved slightly from the cut face of the material 4 when the saws 1, 1 approach the completion of the sawing operation, avoiding violent shaking of the saws 1, 1, and at the same time utilizing nearly the entire length of the saws 1, 1, to perform the cutting operation most efficiently.

Fig. 5 shows the high pressure aperture 28—a in the middle of the cylinder 28 and the low pressure apertures 28—b in the ends of the cylinder 28, connected respectively to the high pressure pump 34 and the low pressure pump 35, through the respective pipes 32 and 33. These pumps 34 and 35 are operated by suitable power transmission means (not shown) from the shaft of the pulley 24.

The low pressure oil pipes 33 are constantly connected with the cylinder 28 so that the low pressure oil being fed into the cylinder exerts pressure on the pistons 29, 29, and the excess oil escapes into the oil tank 36 through the safety valve 33—a and pipe 33—b. The high pressure oil pipe 32 is not connected directly to the high pressure pump 34 but is connected thereto through the regulator 37 and oil pipe 32—a.

Referring particularly to the construction and operation of the oil pressure regulator 37, in the valve chamber 37—a leading to the high pressure oil pipe 32, there are valve seats 37—b, 37—c and plate valves 38 and 39. The valve 38 is pressed against the seat 37—b by spring 40, while valve 39 is disposed away from seat 37—c by spring 41. The spring 42 is designed when expanded not to press against valve 39. In this condition of the parts, the high pressure oil flowing into the valve chamber 37—a from the high pressure pump 34 through pipe 32—a is, as shown by the arrows in Fig. 13, supplied to the oil pipe 32 and flowing into the central part of the cylinder 28 pushes the pistons 29, 29 outwardly against the pressure of the low pressure oil and gives the requisite pressure to force the saws 1, 1 toward the material 4, for their cutting operation. 43 is a safety valve which excess oil opens to flow out through pipe 44 into the oil tank 36. By rotating the screw lid 45, the spring 46 can be adjusted so that the safety valve 43 controls the force of the oil pressure which operates on the saws 1, 1. The plate valve 38 carries a valve rod 38—a which when pushed from outside of the valve chamber 37—a moves the valve 38 from the seat 37—b. The inner end of the rod 38—a contacts the valve rod 39—a of the valve 39. Until this contact occurs, the valves 38 and 39 are removed from their seats 37—b and 37—c, respectively. In this condition of the parts, the oil, as shown by the arrows in Fig. 14, flows up from the cylinder 28, through pipe 32 into the valve chamber 37—a and passes together with the high pressure oil coming from the pump 34 into the oil tank 36 through pipe 47, with the consequence that the pressure in pipe 32 falls so that the pistons 29, 29 are pushed back by the low pressure oil in the cylinder 28, and during such time, the saws 1, 1 move away from the material 4. However, if the inner end of the valve rod 38—a pushes the other valve rod 39—a, the spring 41 is compressed and the valve 39 is seated on the seat 37—c, and further pressure compresses the spring 42, as the rod 39—a slides through the valve 39. In this condition of the parts, shown in Fig. 15, the oil is prevented from flowing up from the cylinder 28, so that the pistons 29, 29 do not move in the cylinder 28, and the separating movement of the saws 1, 1 ceases. The separating movement of the saws 1, 1 begins when the tappet 48 (Fig. 5) pushes the end of the rod 38—a projecting outside of the valve chamber 37—a. This tappet 48 is actuated by a bell-crank lever 49 carrying roller 49—a which is moved by cam 50 carried by shaft 19.

Figs. 16, 17 and 18 are diagrammatic illustrations corresponding to Figs. 13, 14 and 15 and show the positions into which the crank pin 19—b moves. Fig. 16 shows that while the high pressure oil operates to move the saws 1, 1 toward one another to press them against the material 4, the crank pin 19—b moves from the upper dead center point A to the lower dead center point B, and during this period the saws 1, 1 descend in their working stroke. Fig. 17 shows that while the low pressure oil operates to retract the saws 1, 1 from the material 4, the crank pin 19—b moves from the lower dead center point B to the next point C, and from this figure it will be seen that the saws are removed from the material 4, during a very short portion of the travel of the crank pin 19—b and consequent short vertical movement of the saws 1, 1. Fig. 18 shows that while the saws 1, 1 are held immovable (Fig. 15), the crank pin 19—b moves from the point C to the upper dead center A, raising the saws 1, 1, and from this figure it will be seen that during the ascent of the saws 1, 1, they are held immovable horizontally in positions but little removed from the material 4, so that they need be moved only a short distance to exert pressure on the next working stroke.

Further the invention provides means by which when the saws 1, 1 have reached the central part of the material 4, they act alternately, after they have come within certain limits of mutual contiguity, so that there shall always be a small space left between the two saws 1, 1 to obviate any possibility of contact with one another. As shown in Figs. 10 and 11, eccentric discs 51 are provided to bear against the upper ends of the levers 31. As these discs rotate on their shafts 51—a in proper co-ordinated positions when they are in the position shown in Fig. 10, the upper end of the left lever 31 extends outwardly to the left and the lever pushes the left saw 1 to the right, without any restraint from the left disc 51, and the right lever 51 is restrained from moving toward the right by the right disc 51 so that the right saw 1 is restrained from moving the full distance to the left. Similarly, as shown in Fig. 11, the levers 31 operate reversely so that the left saw 1 is restrained while the right saw is permitted to move forward the full distance. Thus it will be seen that by this mechanism the saws 1, 1 are prevented from contact when they approach the central part of the material 4.

The gearing for these eccentric discs 51 is shown in Figs. 1 and 3. Bevel gears 52 are fixed on the shafts 51—a of the eccentric discs 51, respectively, and mesh with bevel gears 53, respectively, secured on the horizontal shaft 54 which is journaled in bearings 55 on the front of the machine frame. This horizontal shaft 54 has a bevel gear 56 which meshes with the bevel gear 57 which is fixed on the vertical shaft 58 journaled in the bearings 55' on the front of the machine frame. On the upper end of the vertical shaft 58 there is fixed the bevel gear 59 which meshes with the bevel gear 60 fixed on the shaft 19.

What I claim is:

1. In a sawing machine, the combination of means to support a mass of material to be sawed; a pair of saws disposed adjacent opposite sides of said mass, respectively, and adapted to be reciprocated along two paths lying in a plane transverse to the longitudinal axis of the mass, said paths being at an angle of 90° to one another; means adapted to reciprocate said saws along one of said paths; and means adapted to reciprocate said saws along the other of said paths, said two reciprocating means being adapted to so co-act that the saws are moved toward each other along one of said paths, to cut progressively deeper into said mass, on each stroke in one direction along the other of said paths, are moved along said first path, away from each other and slightly away from said mass, at the end of said stroke and during a portion of the stroke in the opposite direction along the second path, and are held against movement along said first path during the remainder of the last mentioned stroke.

2. In a sawing machine, the combination of means to support a mass of material to be sawed; a pair of saws disposed adjacent opposite sides of said mass, respectively, and adapted to be reciprocated in a vertical plane, and to be reciprocated in a horizontal plane; means adapted to reciprocate said saws vertically; and pressure means adapted to reciprocate said saws horizontally, said two reciprocating means being adapted to so co-act that the saws are pressed toward each other and into working position against said sides, respectively, under constant pressure for progressive cutting action on each downward stroke, moved slightly away from said mass at the end of the downward stroke and during a period of the upward stroke, and are held against horizontal movement during the remainder of the upward stroke.

3. In a sawing machine, the combination of means to support a mass of material to be sawed; a pair of saws disposed adjacent opposite sides of said mass, respectively, and adapted to be reciprocated in a vertical plane, and to be reciprocated in a horizontal plane; means adapted to reciprocate said saws vertically; and means adapted to reciprocate said saws horizontally, said two reciprocating means being adapted to so co-act that the saws are moved into working position against said sides, respectively, on each downward stroke, and have horizontal movement into said mass for progressive cutting action during the whole of each downward stroke, are moved horizontally out of contact with said mass during a portion of each upward stroke, and are maintained immobile horizontally during the remainder of each upward stroke.

4. In a sawing machine, the combination of means to support a mass of material to be sawed; a pair of saws disposed adjacent opposite sides of said mass, respectively, and adapted to be reciprocated in a vertical plane, and to be reciprocated in a horizontal plane; means adapted to reciprocate said saws vertically; a single pressure means adapted to press said saws toward each other horizontally and into said mass for progressive cutting action during each downward stroke; and means adapted to move said saws horizontally away from said mass, during a portion of each upward stroke, and maintain said saws immobile horizontally during the remainder of the upward stroke.

5. In a sawing machine, the combination of means to support a mass of material to be sawed; a pair of saws disposed adjacent opposite sides of said mass, respectively; a vertically reciprocatory frame in which said saws are mounted for horizontal reciprocation therein; a pair of horizontally reciprocable frames in which said saws are respectively mounted for vertical reciprocation therein; a hydraulic system, comprising a high pressure circuit and a low pressure circuit adapted to reciprocate said pair of frames to move said saws toward and away from said mass, respectively; and means adapted to regulate the operation of said system, said regulating means being operated by the means for reciprocating said vertically moving frame.

6. In a sawing machine, the combination of means to support a mass of material to be sawed; a pair of saws disposed adjacent opposite sides of said mass, respectively, and adapted to be reciprocated horizontally and vertically; a hydraulic system for reciprocating said saws horizontally, comprising a low pressure circuit and a high pressure circuit, said low pressure circuit exerting constant pressure tending to move said saws away from said mass, and valve means for controlling said high pressure circuit; and means for reciprocating said saws vertically, said vertically reciprocating means operating said valve means to render the high pressure circuit operative to move the saws toward the mass during each downward stroke, to render the high pressure circuit inoperative to permit the low pressure circuit to move the saws away from said mass at the end of the downward stroke and a portion of the upward stroke, and to render both circuits inoperative to maintain the saws immobile horizontally during the remainder of the upward stroke.

7. In a sawing machine, the combination of means to support a mass of material to be sawed; a pair of saws disposed adjacent opposite sides of said mass, respectively; a vertically reciprocatory frame in which said saws are mounted for horizontal reciprocation therein; a pair of horizontally reciprocable frames in which said saws are respectively mounted for vertical reciprocation therein; means for reciprocating said vertically reciprocatory frame; means for reciprocating said horizontally reciprocable frames; and means for so limiting the reciprocation of said horizontally reciprocable frames that the saws function alternately as they reach an area of the mass closely adjacent its longitudinal axis.

8. In a sawing machine, the combination of means to support a mass of material to be sawed; a pair of saws disposed adjacent opposite sides of said mass, respectively; a vertically reciprocatory frame in which said saws are mounted for horizontal reciprocation therein; a pair of horizontally reciprocable frames in which said saws are respectively mounted for vertical reciprocation therein; means for reciprocating said vertically reciprocatory frame; means for reciprocating said horizontally reciprocable frames; and means for so limiting the reciprocation of said horizontally reciprocable frames that the saws are prevented from contacting one another as they reach the longitudinal axis of the mass.

TAKAO HASEGAWA.